UNITED STATES PATENT OFFICE.

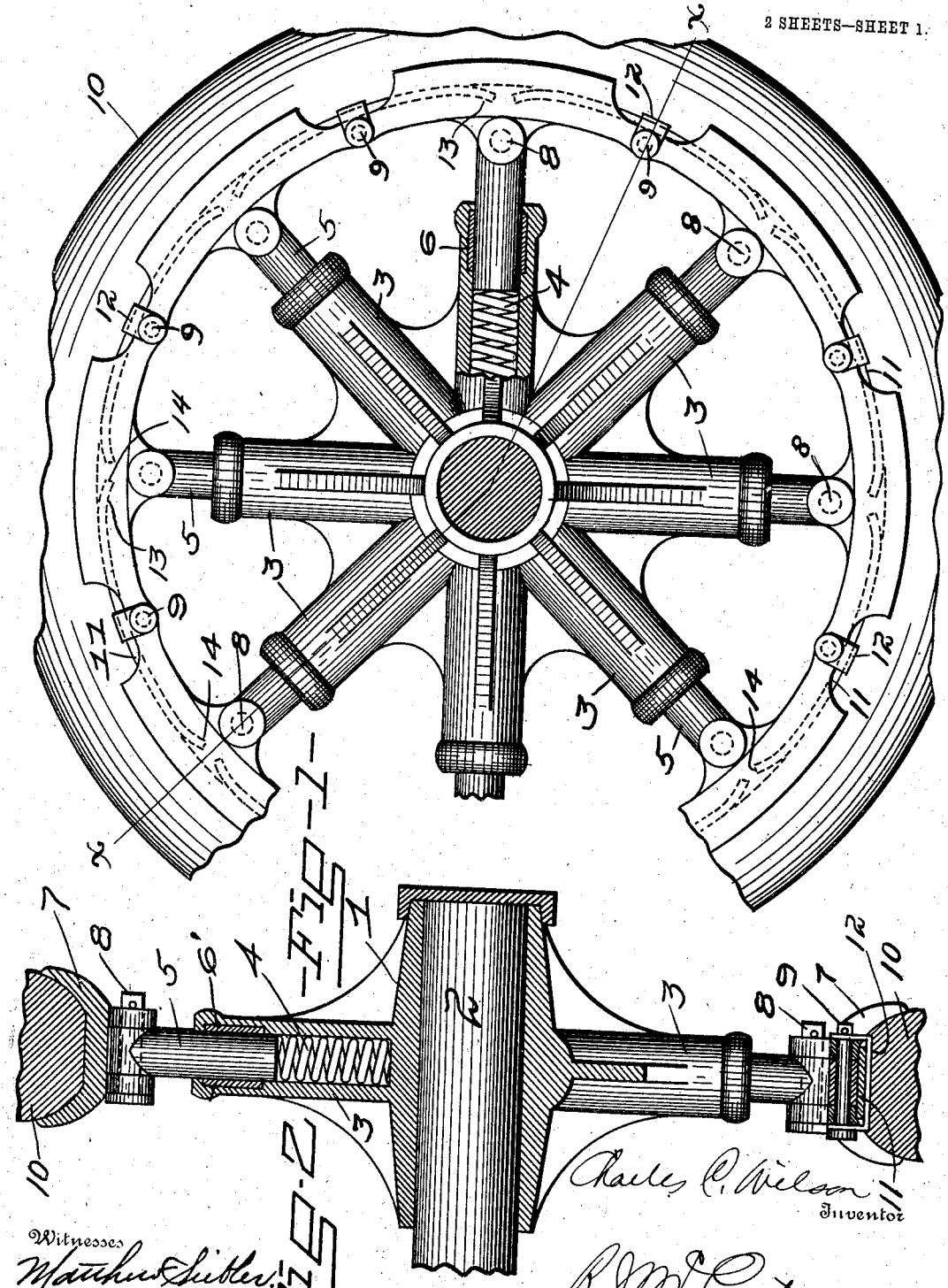

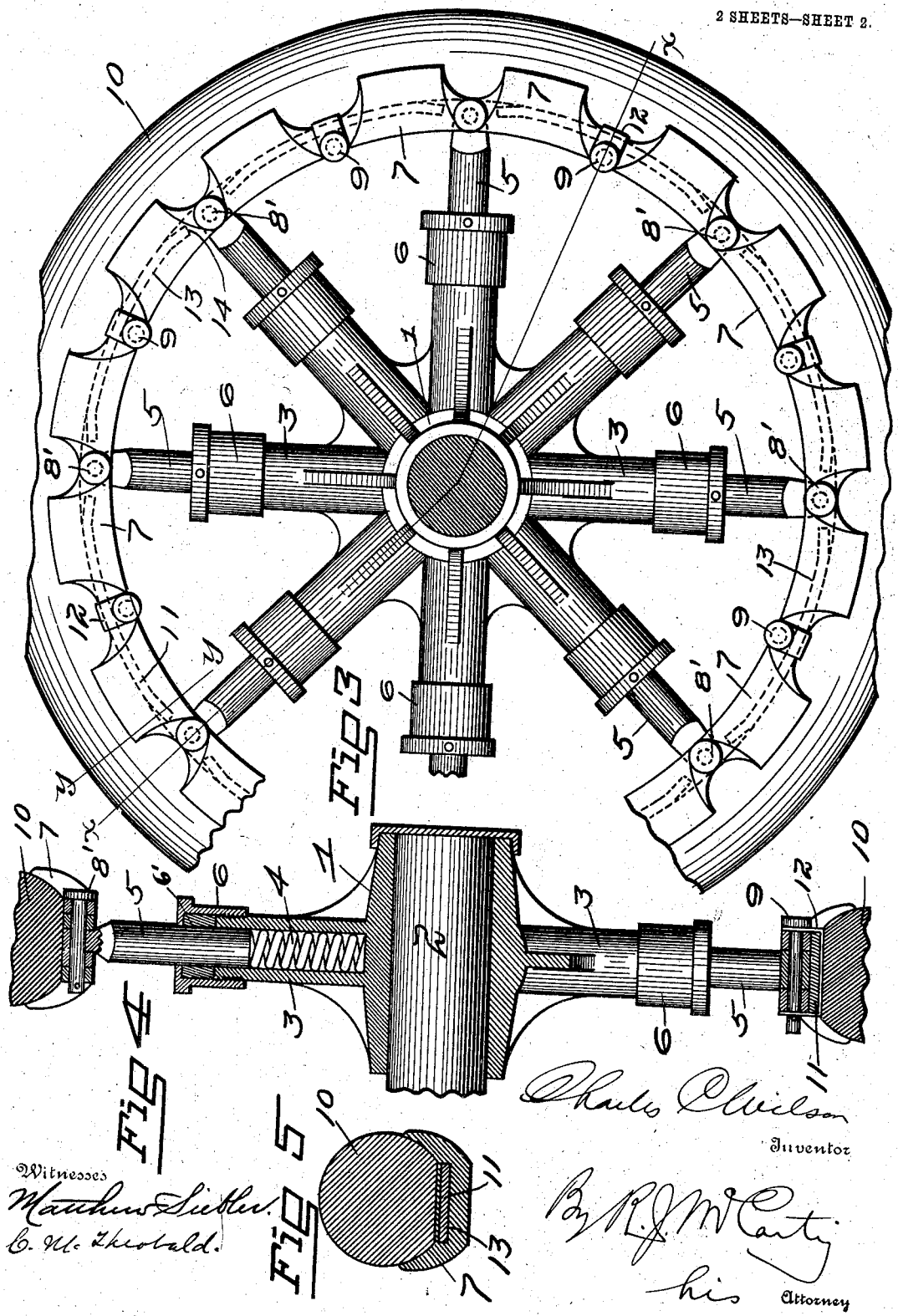

CHARLES C. WILSON, OF DAYTON, OHIO.

VEHICLE-WHEEL.

No. 815,573.   Specification of Letters Patent.   Patented March 20, 1906.

Application filed November 1, 1905. Serial No. 285,387.

*To all whom it may concern:*

Be it known that I, CHARLES C. WILSON, a citizen of the United States, residing at Dayton, in the county of Montgomery and State of Ohio, have invented certain new and useful Improvements in Vehicle-Wheels; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to new and useful improvements in vehicle-wheels; and it consists of the novel and useful structural features hereinafter described and claimed.

The object of the invention is to provide a vehicle-wheel which dispenses with the use of pneumatic tires and the usual vehicle-springs by substituting springs in the wheel itself which will produce the desired resiliency, all as hereinafter more fully described and claimed.

Preceding a detail description of the invention reference is made to the accompanying drawings, of which—

Figure 1 is a plan view of a vehicle-wheel made in accordance with my invention, parts being broken away. Fig. 2 is a sectional view on the line $x\,x$ of Fig. 1. Fig. 3 is a plan view showing a slight modification as compared with the construction shown in Fig. 1. Fig. 4 is a section on the line $x\,x$ of Fig. 3. Fig. 5 is a section on the line $y\,y$ of Fig. 3.

In a detail description of the invention, similar reference characters indicate corresponding parts.

The wheel-hub 1, which receives the axle-journal 2, has projected from it a suitable number of tubular spokes 3, in which are seated a series of springs 4.

5 designates a series of plunger-spokes which project into the tubular spokes 3 against the springs 4. The outer ends of the tubular spokes are provided with stuffing-boxes 6, which prevent the spokes 5 from rattling during the movements of the wheel. The stuffing-boxes contain glands 6' of any suitable material for taking up lost motion and preventing rattling.

7 designates a series of metallic rim-segments which are pivotally connected at 8 to the outer ends of the plunger-spokes 5. These rim-segments 7 are also hinged to each other by bolts 9, so that when said rim-segments are connected they form a complete circle and receive the solid elastic tire 10. The rim-segments so connected have similar inward movement on their hinges at the point of pressure.

Placed within the rim formed by the segments 7 are a series of leaf-springs 11, each of which is held at its center by a clip 12, which embraces said spring or springs and is connected with the hinges 9, which connect the ends of the rim-segments. These springs 11 lie within a suitable cavity or recess 13 in the outer sides of the rim-segments 7, and the ends of said springs abut against shoulders 14, formed by said recesses 13, so that the springs are maintained against any longitudinal shifting. These leaf-springs compensate for movement of the joints connecting them and impart to the assembled rim-segments a desirable amount of firmness, which is overcome only by the weight placed upon the plunger-spokes.

In Fig. 3 a slight modification is shown, which consists in increasing the number of rim-segments 7 in order to obtain a greater amount of resiliency in the rim as a whole, if desired. These rim-segments are the same in in all essential particulars; but the plunger-spokes 5 are connected to the ends of said segments by hinges 8', which also form hinge connections for the ends of the rim-segments. The springs 11 are the same in both cases and are held in the same manner by clips 12, which are connected by the hinge-bolts 9, which connect the ends of the rim-segments.

Having described my invention, I claim—

1. In a vehicle-wheel, a series of rim-segments hinged at their adjacent ends, a series of plunger-spokes pivotally connected to said rim-segments, a series of tubular spokes projected from a hub, springs inclosed within said tubular spokes and against which the plunger-spokes bear, a series of leaf-springs lying within the rim-segments and suitably secured therein, and a tire placed against said leaf-springs and within the rim-segments, substantially as set forth.

2. In a vehicle-wheel, a hub provided with a series of tubular spokes having stuffing-boxes as described, a series of springs located within said tubular spokes, a series of plunger-spokes passing through the stuffing-boxes in said tubular spokes and engaging the springs therein, a series of rim-segments hinged at their adjacent ends and connected with the plunger-spokes, and leaf-springs seated within said rim-segments and projected over the hinged ends of said rim-segments, substantially as set forth.

3. In a vehicle-wheel, a hub having a series of tubular spokes provided with stuffing-boxes, a series of coil-springs mounted within said tubular spokes, plunger-spokes projected through the stuffing-boxes and movable against the springs within the tubular spokes, a series of rim-segments pivotally connected to the plunger-spokes, said rim-segments having their adjacent ends hinged, and a series of leaf-springs placed within said rim-segments and connected to said rim-segments at the hinges which connect the ends of said rim-segments, substantially as set forth.

4. In a vehicle-wheel, a hub having a series of tubular spokes provided with stuffing-boxes, a series of springs located within said tubular spokes, plunger-spokes projected through said stuffing-boxes and engaging said springs, a series of rim-segments arranged in a circle, the adjacent ends of said rim-segments being hinged and each alternate hinge forming a connection with one of the plunger-spokes, and a series of leaf-springs placed within said rim-segments and projecting over each alternate hinge connecting the ends of said rim-segments, and means for suitably securing said leaf-springs in position, substantially as set forth.

In testimony whereof I affix my signature in presence of two witnesses.

CHARLES C. WILSON.

Witnesses:
CAROLYN M. THEOBALD,
R. J. McCARTY.